(No Model.)
L. E. BROWN.
MILK JAR AND TESTER COMBINED.
No. 589,382. Patented Aug. 31, 1897.
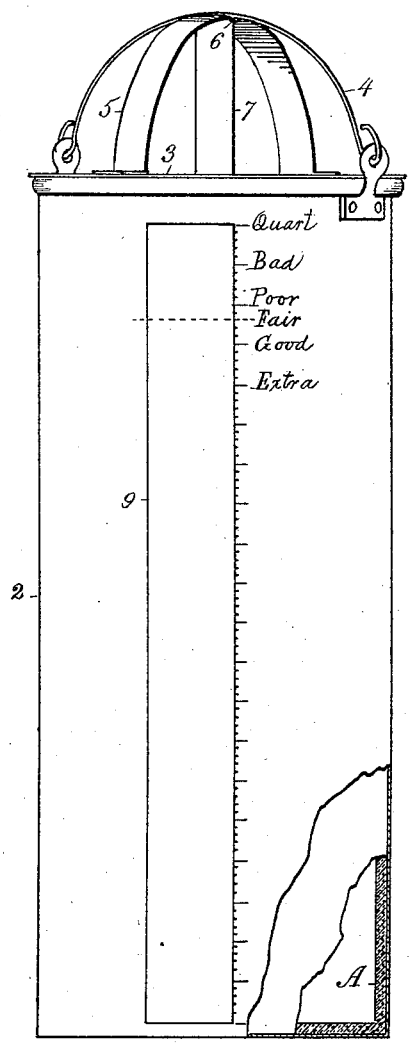
Fig. I.
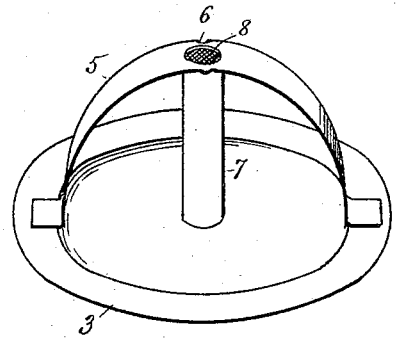
Fig. II.
Witnesses
R. S. Millar
L. M. Adams
Inventor
L. E. Brown
By J. Bailey Atty

UNITED STATES PATENT OFFICE.

LEWIS E. BROWN, OF HARTWELL, OHIO, ASSIGNOR TO WILLIAM RODENBECK, OF ELMWOOD PLACE, OHIO.

MILK JAR AND TESTER COMBINED.

SPECIFICATION forming part of Letters Patent No. 589,382, dated August 31, 1897.

Application filed March 5, 1897. Serial No. 626,073. (No model.)

*To all whom it may concern:*

Be it known that I, LEWIS E. BROWN, a citizen of the United States, residing at Hartwell, in the county of Hamilton and State of Ohio, have invented a new and useful Improvement in Milk Jars and Testers Combined, which improvement is fully set forth in the following specification and accompanying drawings, in which—

Figure 1 is a side elevation, partly in section, of my improved milk jar and tester; and Fig. 2, a detail view of the cover and its adjuncts.

My invention relates to special improvements in milk jars and testers in combination; and my object is to provide a novel and useful domestic utensil designed for the double purpose of a safe and convenient receptacle for milk and at the same time a reliable protection against the fraudulent and too common practice on the part of unscrupulous dairymen and dealers of supplying families and others with watered or otherwise adulterated milk. The result, especially upon young children and invalids who rely entirely upon cow's milk for nourishment, is so serious that it has awakened the earnest attention of medical men and boards of health in many communities, and they are uniting in a vigorous effort to abate the evil by legislative enactments providing an adequate penalty for the offense.

The peculiar features of the invention and its perfect adaptation to the purposes herein described will be apparent by referring to the accompanying drawings, in which—

A represents a cylindrical glass jar inclosed in a jacket 2, made of tin or other suitable metal and having a self-adjusting closely-fitting cover 3. This is secured by the wire bail 4, which springs over the arch 5 and engages a notch 6. It will be seen that the cover is thus held in close contact with the top of the jar and cannot be dislodged by accidental overturning of the same. A tube 7, supported by the arched brace 5, is inserted in the center of the cover and has a fine-wire screen 8 in its upper end. Sufficient ventilation is thus provided for the milk, while dust or other foreign matter is effectually excluded.

It has been thoroughly demonstrated that pure milk will invariably yield a certain proportion of cream. Assuming the capacity of the jar in the accompanying illustration to be one quart, and the proper proportion of cream to be one in twelve, it is evident that if the jar be filled and proper time be allowed for the separation to take place the cream will occupy the upper twelfth of the jar, as will be clearly seen through the slot 9 in the jacket, as indicated by a dotted line in the drawings.

If it be desired to make a critical test, the border of the slot is provided with an accurately-graded scale, but for general purposes it will suffice to have a few plainly-marked degrees which will indicate the required standard, it being understood that any variation therefrom will be apparent at sight, any diminution in the quantity of cream showing that the milk is inferior. The same jar may be used for a pint, or any other portion of a quart, by fixing a scale of degrees to correspond.

It will be evident that the device can also be utilized for testing cream by simply having a scale for that purpose at the lower end of the slot, which will indicate the amount of milk over and above any quantity which may be established as a standard.

What I claim as new is—

A milk jar and tester comprising a glass receptacle inclosed in a metal jacket having a vertical slot, a self-adjusting jar-cover provided with a ventilating-tube, a spring-bail adapted to retain the cover in position when closed, and a graduated scale for indicating the quality or grade of milk or cream substantially as herein specified.

In testimony that I claim the foregoing I have hereunto set my hand, this 13th day of February, 1897, in the presence of two witnesses.

LEWIS E. BROWN.

Witnesses:
J. R. FORAKER,
JOSEPH HEINTZMAN.